United States Patent
Bossler

(10) Patent No.: US 7,165,474 B2
(45) Date of Patent: Jan. 23, 2007

(54) TORQUE DIVIDING GEAR DRIVE SYSTEM AND METHOD OF DRIVING AN OUTPUT GEAR

(75) Inventor: Robert B. Bossler, Hacienda Heights, CA (US)

(73) Assignee: The Boeing Company, Chicago, IL (US)

( * ) Notice: Subject to any disclaimer, the term of this patent is extended or adjusted under 35 U.S.C. 154(b) by 85 days.

(21) Appl. No.: 10/856,223

(22) Filed: May 28, 2004

(65) Prior Publication Data

US 2004/0237684 A1 Dec. 2, 2004

Related U.S. Application Data

(60) Provisional application No. 60/473,858, filed on May 28, 2003.

(51) Int. Cl.
*F16H 37/06* (2006.01)

(52) U.S. Cl. .......... 74/665 C; 74/409; 74/410; 74/665 A

(58) Field of Classification Search ........ 74/665 A, 74/665 C, 409, 410, 411, 423; 475/346
See application file for complete search history.

(56) References Cited

U.S. PATENT DOCUMENTS

| 1,667,475 A | 4/1928 | Kasley |
| 1,671,479 A | 5/1928 | McIntyre |
| 1,754,192 A | 4/1930 | Van Vliet |
| 2,049,339 A | 7/1936 | Van Atta |
| 2,419,305 A | 4/1947 | Woolson et al. |
| 2,545,458 A | 3/1951 | Ginn |
| 2,821,841 A | 2/1958 | Barhta et al. |
| 2,969,781 A | 1/1961 | Kolbe |
| 3,129,608 A * | 4/1964 | Watson ............... 74/665 C |
| 3,332,404 A | 7/1967 | Lovercheck |
| 3,390,670 A | 7/1968 | Brice |
| 3,540,420 A | 11/1970 | Syson |
| 3,568,649 A | 3/1971 | Syson et al. |
| 3,852,963 A | 12/1974 | Hufstader |
| 4,038,640 A | 7/1977 | Lee et al. |
| 4,167,857 A | 9/1979 | Nishijima et al. |
| 4,297,907 A | 11/1981 | Bossler, Jr. et al. |

(Continued)

FOREIGN PATENT DOCUMENTS

JP 57083747 A * 5/1982

(Continued)

*Primary Examiner*—David D. Le
(74) *Attorney, Agent, or Firm*—MacPherson Kwok Chen & Heid LLP; Greg J. Michelson

(57) ABSTRACT

A torque dividing gear drive system, a method of driving an output gear, and a method of evenly dividing an output torque between three gears is provided. The torque dividing gear drive system that is provided has a first gear driven by an engine, a second gear coupled to the first gear, a third gear coupled to the first gear, a fourth gear coupled to the first gear, a fifth gear driven by the second gear, a sixth gear driven by the third gear, a seventh gear driven by the fourth gear, and an eighth gear driven by the fifth, sixth and seventh gears. The first gear may be a floating gear. A method of operating such system is also provided.

22 Claims, 5 Drawing Sheets

U.S. PATENT DOCUMENTS

| | | |
|---|---|---|
| 4,321,805 A | 3/1982 | Bossler, Jr. |
| 4,518,287 A | 5/1985 | Bossler, Jr. |
| 4,773,372 A | 9/1988 | Stumm et al. |
| 4,854,190 A * | 8/1989 | Won ............................. 475/5 |
| 4,957,072 A | 9/1990 | Goldowsky |
| 4,974,972 A | 12/1990 | Boosler, Jr. et al. |
| 5,003,935 A | 4/1991 | Goldowsky |
| 5,125,756 A | 6/1992 | Bossler, Jr. |
| 5,135,442 A | 8/1992 | Bossler, Jr. |
| 5,156,229 A | 10/1992 | Yasui et al. |
| 5,178,028 A | 1/1993 | Bossler, Jr. |
| 5,196,998 A | 3/1993 | Fulton |
| 5,233,886 A | 8/1993 | Bossler, Jr. |
| 5,400,748 A | 3/1995 | Batzill et al. |
| 5,479,903 A | 1/1996 | Werner et al. |
| 5,579,731 A | 12/1996 | Pong |
| 5,622,143 A | 4/1997 | Fuoss et al. |
| 5,778,833 A | 7/1998 | Kuranishi |
| 5,813,292 A * | 9/1998 | Kish et al. ................ 74/665 C |
| 5,992,393 A | 11/1999 | Yoshida et al. |
| 6,105,542 A | 8/2000 | Efford |
| 6,122,985 A * | 9/2000 | Altamura ..................... 74/411 |
| 6,178,932 B1 | 1/2001 | Matsuda et al. |
| 6,223,704 B1 | 5/2001 | Chatelain |
| 6,321,698 B1 | 11/2001 | Rau et al. |
| 6,364,611 B1 * | 4/2002 | Matsuda et al. ........ 416/170 R |
| 6,855,087 B2 * | 2/2005 | Chakraborty ............... 475/230 |

FOREIGN PATENT DOCUMENTS

WO     WO 9206317 A1 *   4/1992

* cited by examiner

TORQUE DIVIDING GEAR DRIVE SYSTEM AND METHOD OF DRIVING AN OUTPUT GEAR

CROSS REFERENCE TO RELATED APPLICATION

This application is based upon and claims priority of U.S. Provisional Application No. 60/473,858, filed on May 28, 2003, the contents of which are fully incorporated herein by reference.

BACKGROUND OF THE INVENTION

This invention relates generally to a gear arrangement for transmitting torque and to a method of doing the same. More specifically, the present invention provides a gearing system for evenly distributing a torque between three gears and to a method of operating such system, as well as to a method of driving an output gear.

A variety of gear arrangements have been used for transmitting torque through an angle. A spur gear driving a face gear is one such arrangement. A spur gear is a wheel with straight gear teeth on its circumference, the teeth edges being parallel to the axis of the rotation. A face gear is a gear wheel having its axis of rotation at an angle to that of the driving spur gear. The teeth on the face gear are located on the end face of the wheel, with the teeth edges directed toward the axis of the rotation. The spur gear can move freely along its axis of rotation, within the limits of the length of its teeth. Furthermore, a spur gear has more tolerance for movement toward or away from a driven face gear than does an equivalent spiral bevel gear. A spur gear/face gear combination (i.e., a spur gear meshed with a face gear) optimizes the torque transfer capability between such gears as the speed reduction ratio increases.

Bevel gears also are used to transmit torque through an angle. Spiral bevel gears have curved teeth that carry more load than straight bevel gears. However, spiral bevel gears are very sensitive to changes in relative location. Thermal growth and deflections under load are serious limitations to spiral bevel gears. Therefore, spiral bevel gears are best suited to low speed reduction ratios close to 1 to 1. In addition, spiral bevel gears do not have conjugate action, resulting in minute acceleration and deceleration of the driven gear. The speed changes manifest themselves as noise and vibration.

Torque splitting has been attempted in transmissions. The reduced torque in parallel paths results in smaller and lighter components and smaller and lighter gearboxes. Various arrangements have been proposed. However, one problem has been an automatic precise torque split. A further problem is to reduce the number of stages needed between the input and output speeds. The way to reduce the number of stages is to increase the reduction ratio per stage.

SUMMARY OF THE INVENTION

The present invention provides a gearing system for evenly distributing a torque between three gears and to a method of operating such system, as well as to a method of driving an output gear. The present invention provides in an exemplary embodiment a torque dividing gear drive system having a first gear driven by an engine, a second gear coupled to the first gear, a third gear coupled to the first gear, a fourth gear coupled to the first gear, a fifth gear driven by the second gear, a sixth gear driven by the third gear, a seventh gear driven by the fourth gear, and an eighth gear driven by the fifth, sixth and seventh gears. In another exemplary embodiment, the system further has a ninth gear and a tenth gear that are driven by the fourth gear for driving the seventh gear. In either of the aforementioned exemplary embodiments, the first gear may be a floating gear.

In a further exemplary embodiment, the first gear is meshed with the second, third and fourth gears. In another exemplary embodiment, the second and fifth gears form a first compound gear, the sixth and third gear form a second compound gear, and/or the ninth and seventh gears form a third compound gear.

In yet another exemplary embodiment, the system includes a tenth gear driven by the third gear. In this embodiment, the tenth gear drives the ninth gear. In this exemplary embodiment, the third gear may drive a shaft which drives the tenth gear. The shaft may be hollow.

In the aforementioned exemplary embodiments, the gears may be face or spur type gears. Either of the aforementioned exemplary embodiments may be incorporated in a helicopter transmission, where the eighth gear drives the helicopter rotor shaft.

In a further exemplary embodiment a method of evenly dividing the torque between three gears is provided. The method includes coupling a driven gear to an engine and meshing the driven gear to the three gears. The method further includes floating the driven gear between the three gears, where the opposing gear mesh force generated between the meshing of each of the three gears and the driven gear positions the driven gear between the three gears such that the torque is equally distributed to each of the three gears.

In another exemplary embodiment a helicopter transmission system is provided. The system includes a first gear coupled to an engine of the helicopter and driven by the engine. The system includes a second gear coupled to the first gear, a third gear coupled to the first gear, a fourth gear coupled to the first gear, a fifth gear driven by the second gear, a sixth gear driven by the third gear, a seventh gear driven by the fourth gear, and an eighth gear driven by the fifth, sixth and seventh gears. In a further exemplary embodiment, the eighth gear drives an output shaft which drives a rotor of the helicopter. In another exemplary embodiment, the axis of rotation of the eighth gear is perpendicularly oriented relative to an axis of rotation of the first gear.

In yet another alternate exemplary embodiment a method of driving an output gear is provided. The method includes providing a first gear meshed with the output gear, providing a second gear meshed with the output gear, providing a third gear meshed with the output gear, providing a fourth gear for driving the first gear, providing a fifth gear for driving the second gear, providing a sixth gear for driving the third gear, and meshing a driving gear to the fourth, fifth and sixth gears for driving the fourth, fifth and sixth gears.

DETAILED DESCRIPTION OF EXEMPLARY EMBODIMENTS OF THE INVENTION

A torque dividing gear drive system and a method of providing torque to an output gear are provided. The inventive system and method are described in relation to a helicopter transmission 3 for illustrative purposes used in a helicopter power train 5. However, the inventive system and method can be used in other transmissions, systems or mechanisms having gears.

Figure 1:
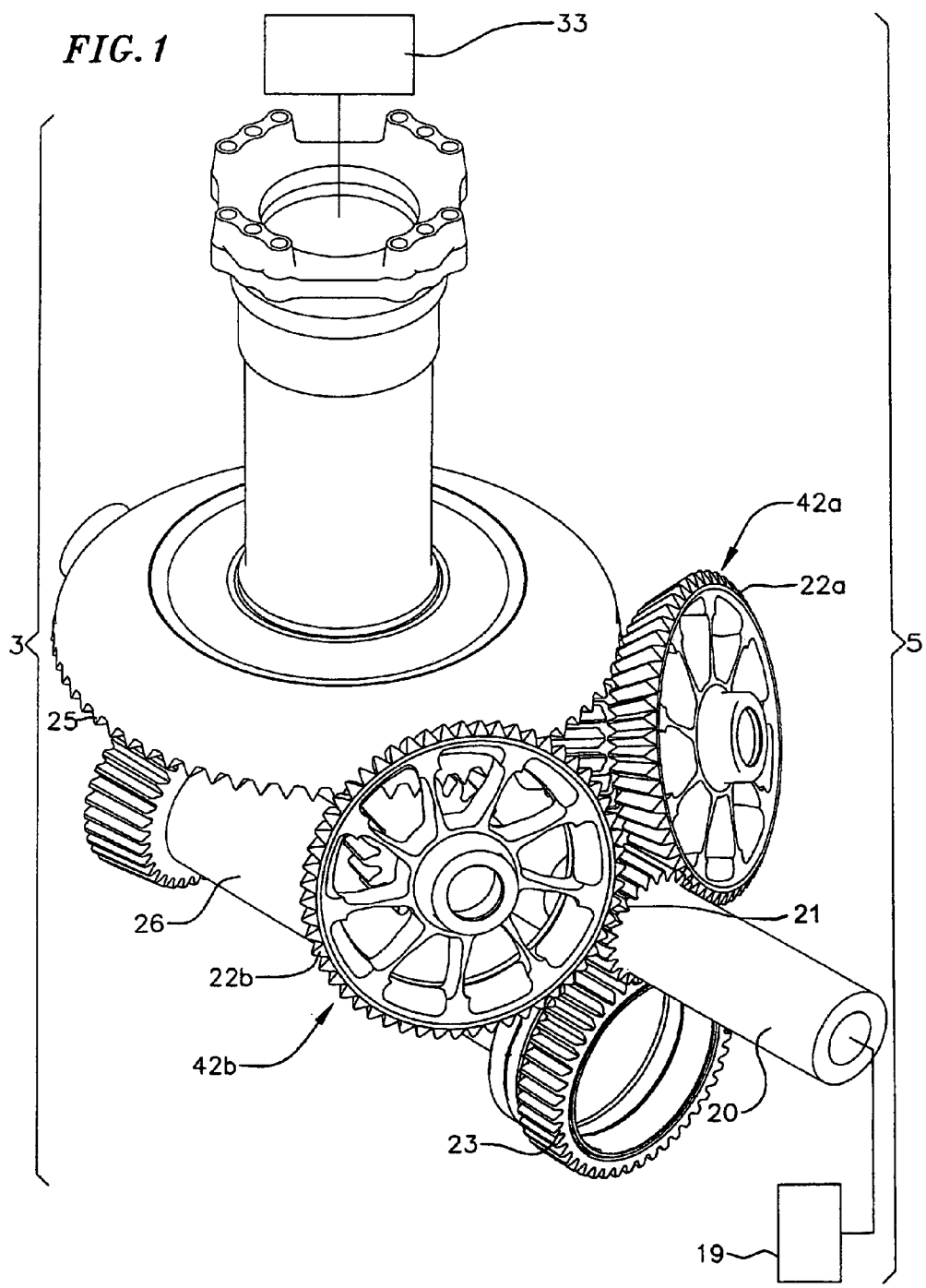
FIG. 1 is a perspective view of an exemplary embodiment torque dividing gear drive system of the present invention.
Figure 3:
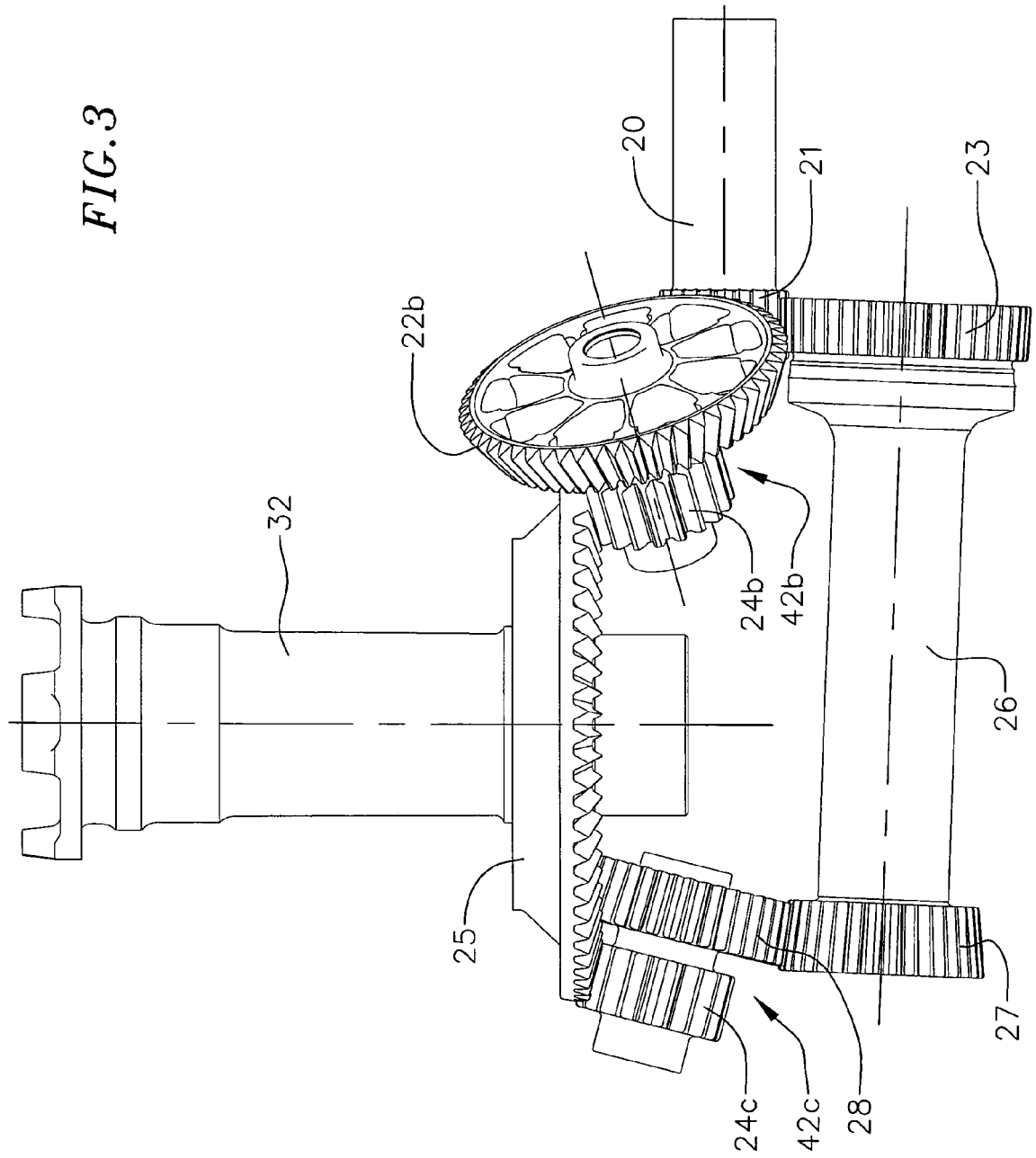
FIG. 3 is a side view of the exemplary embodiment system shown in FIG. 1.
Figure 4:
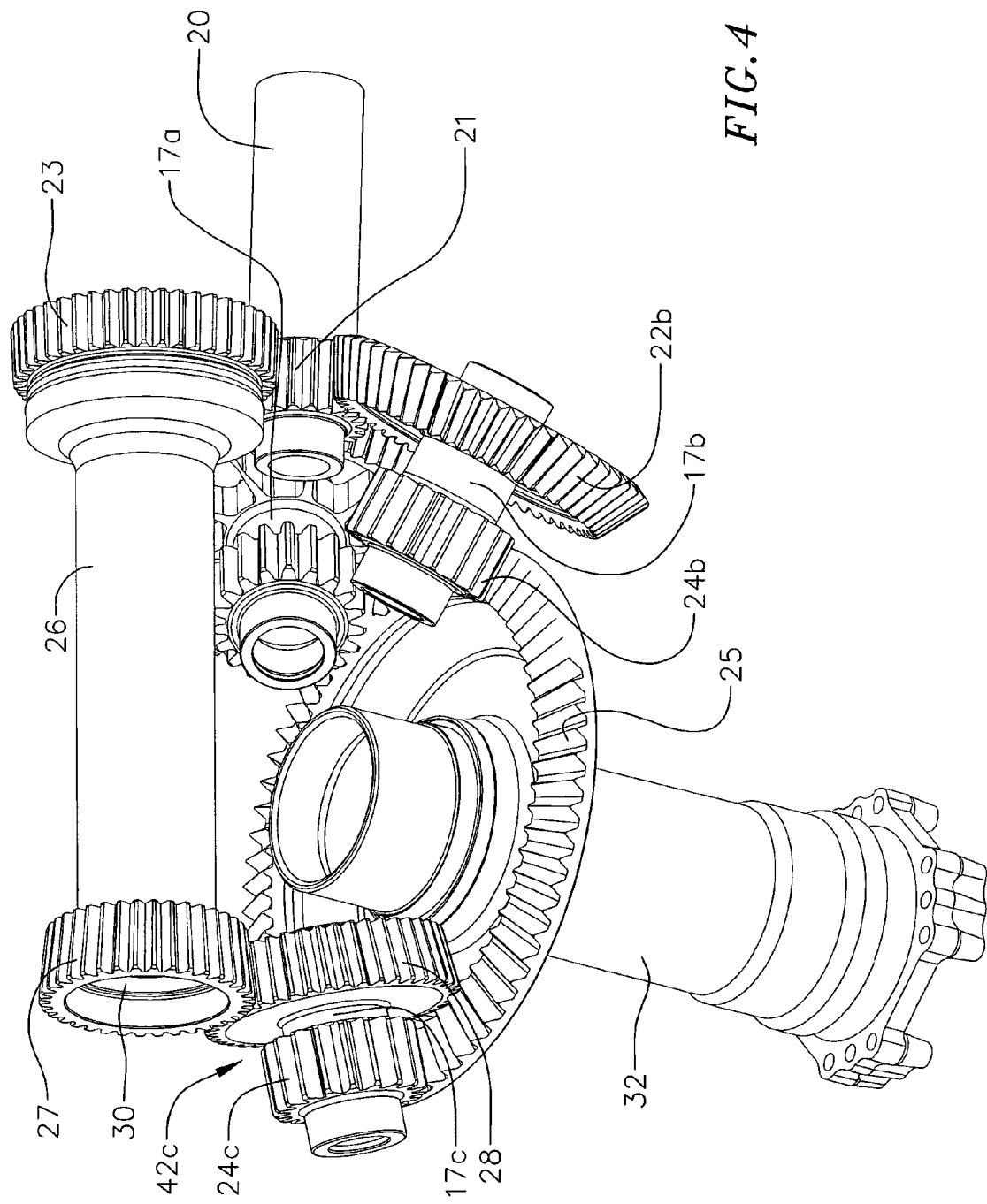
FIG. 4 is a bottom perspective view of the exemplary embodiment system shown in FIG. 1.
Figure 5:
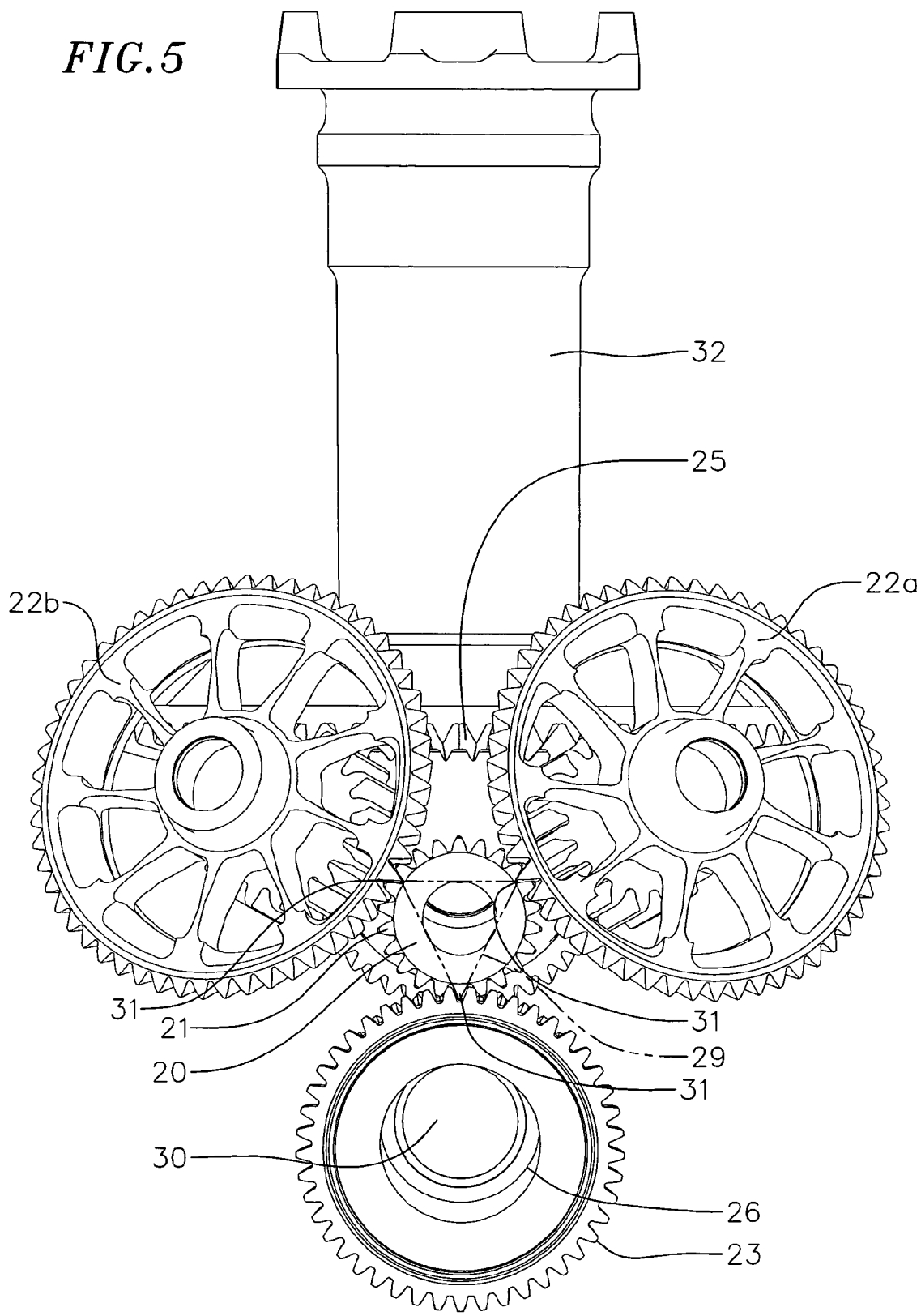
FIG. 5 is a end view of the exemplary embodiment system shown in FIG. 1.

In an exemplary embodiment system as shown in FIGS. 1–5, a pinion shaft 20 is driven by an engine 19 such as a helicopter engine (shown schematically in FIG. 1). In the exemplary embodiment, the pinion shaft is generally horizontal. The pinion shaft is coupled to the engine with a flexible driving connection, as for example a misalignment coupling (not shown). In the exemplary embodiment, the pinion shaft drives a spur gear type pinion 21 (best shown in FIGS. 2 and 3). In the exemplary embodiment, the pinion shaft terminates at the spur gear type pinion 21. As the pinion 21 rotates, it drives two face gears 22a and 22b and a spur gear 23, as for example shown in FIG. 1, at the same pitch velocity (i.e., number of teeth per unit of time). These three gears may or may not have the same diameter. In the exemplary embodiment the pinion 21 is meshed with the face gears 22a, 22b and the spur gear 23. In the exemplary embodiment these three driven gears 22a, 22b, and 23 are mounted on a gear box housing (not shown) with precision bearings such that the meshing points 31 with the spur gear type pinion 21 on the input shaft define the vertices of an equilateral triangle such as triangle 29 depicted by dashed lines in FIG. 5. In other words, in the exemplary embodiment, the three meshing points 31 (as best shown in FIG. 5) between the pinion and three driver gears are 120° apart from each other.

It should be pointed out that the flexible driving connection of the pinion shaft 20 to the engine allows the pinion 21 to float, i.e., to be a floating gear, floating between the two face gears 22a and 22b and the spur gear 23 causing the torque provided by pinion gear 21 to evenly distribute between the three gears 22a, 22b and 23. The opposing gear mesh forces on the input mesh (i.e., the mesh between the pinion 21, and the three gears 22a or 22b and 23) locate the pinion between the three gears such that the torque divides into three equal paths, i.e., it is equally distributed to each of the three gears. To avoid edge loading of the gear teeth, the driven gears, i.e., the two face gears 22a and 22b and the spur gear 23 and/or the pinion 21 may be slightly crowned.

In one exemplary embodiment, the pinion gear has a number of teeth that is divisible by three. In other words, the number of teeth is such that a whole number is obtained when divided by three. However, in other exemplary embodiments, the number of teeth on the pinion gear 21 may not be divisible by 3. That is, a whole number is not obtained when the number of gear teeth on the pinion gear is divided by three. For example, the pinion gear may have 22 teeth. With this latter embodiment, because the three gears, 22a, 22b, and 23 mesh with a pinion gear whose number of teeth are not divisible by three at points which are 120° apart, a progressive mesh is generated which tends to reduce the vibrations generated by the gearing. With a progressive mesh, while one gear is completely meshed with the pinion gear, another gear may be partially meshed with the pinion gear. For example, the first gear may be completely meshed with the pinion gear while the second gear may be partially meshed with the pinion gear, e.g., it may be moving towards a complete mesh with the pinion gear, and while the third gear may also be partially meshed with the pinion gear, but may be moving in a direction to de-mesh from the pinion gear. By being able to use a pinion gear having any number of teeth, the gear reduction to be generated by the gear assembly may be optimized.

By using face gears 22a and 22b and spur gear 23 each of which are greater in diameter than the pinion 21, the rotational output of the pinion 21 and thus of the engine 19 is reduced. Moreover, in alternate exemplary embodiments, 22a, 22b and 23 may all be face gears or spur gears or one of them may be a face gear and the other two may be spur gears. In other exemplary embodiments, the pinion is a gear other than a spur type gear.

Figure 2:
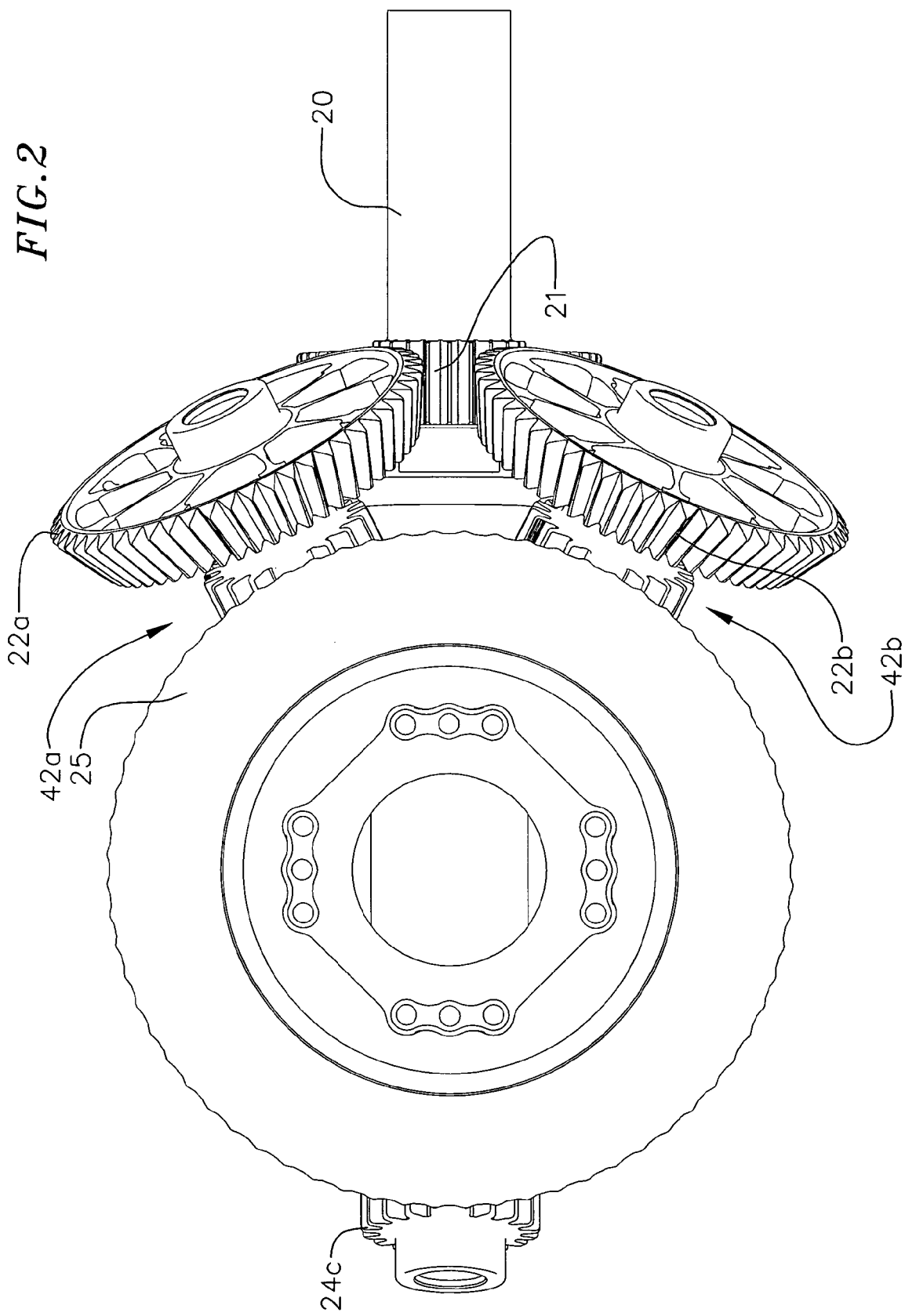
FIG. 2 is a top view of the exemplary embodiment system shown in FIG. 1.

As best shown in FIGS. 2, 3 and 4, the face gears 22a, 22b, are combined or otherwise coupled with spur gears 24a and 24b, respectively. Each spur gear has a smaller diameter than its corresponding face gear. In the exemplary embodiment, each face gear/spur gear combination forms a compound gear, such as compound gears 42a and 42b. For example, each face gear is combined with its corresponding spur gear by a shaft, such as shaft 17a, 17b or 17c, as for example shown in FIG. 4.

The spur gear 23 driven by the pinion 21, in the exemplary embodiment, is a conventional spur gear and is connected to a drive shaft 26, as best shown in FIGS. 1, 3 and 4. The drive shaft 26 drives a spur gear 27 (or a face gear as shown in the FIGS.). In the exemplary embodiment shown in FIGS. 1, 3 and 4, the drive shaft 26 terminates at the spur gear 27. The spur gear 27 drives a face gear 28 as best shown in FIGS. 3 and 4. In the exemplary embodiment shown in FIGS. 3 and 4, the face gear 28 forms a compound gear 42c with a spur gear 24c.

In the exemplary embodiment, the drive shaft 26 is hollow having opposite open ends 30 as shown in FIGS. 4 and 5 which provide access for providing connections to an oil pump, hydraulic pump, electric generators or similar ancillary equipment. The spur gears 24a, 24b and 24c are in the exemplary embodiment each meshed with and drive an output face gear 25 which drives an output shaft 32 such as a rotor shaft 32 of the helicopter which drives rotor 33. This mesh accomplishes the final speed reduction and the angle change of the output shaft 32 to an essentially vertical orientation.

In operation, the engine 19 drive shaft 20 drives the spur type gear pinion 21 which drives the two face gears 22a and 22b and the spur gear 23. The face gears 22a and 22b drive their respective spur gears 24a and 24b. Simultaneously, spur gear 23 drives drive shaft 26 which drives spur gear 27 which drives face gear 28 which drives spur gear 24c. The three spur gears 24a, 24b and 24c drive the output face gear 25. Due to the floating pinion 21 between the face gears 22a and 22b and the spur gear 23, the torque is evenly distributed to gears 22a, 22b and 23 such that an even amount of torque is transmitted by spur gears 24a, 24b and 24c to drive output face gear 25. Thus, when in a helicopter, the helicopter engine 19 provides torque to the inventive torque dividing gear system which in turn divides the torque generally evenly between the three gears 22a, 22b and 23 which drive face gear 25 which drives the helicopter rotor 33.

In the exemplary embodiment, the face gears 22a and 22b have the same diameter and the spur gear 23 has a different diameter than face gears 22a, 22b. Consequently, the diameters of gears 27 and 28 are chosen to have the appropriate diameters such that the pitch velocity of the spur gear 24c is the same as that of spur gears 24a and 24b.

As can be seen the present invention provides a torque dividing gear drive system, a method of operating the same and a system and a method of evenly dividing a torque between three gears driving an output gear. Furthermore, the exemplary inventive system provides for speed reduction, i.e., provides for a reduction of the rotational speed of the output shaft 32 in comparison with the engine rotational speed and does so by using three gear sets, each gear set delivering an even amount of torque. By using three gear sets, the weight of the helicopter transmission is reduced since the weight of a gear is proportional to the square of the torque it transmits. Thus, by using three gears, each having one-third of the torque, the aggregate weight of the three gears would be about ⅓ of the weight of a single gear used to transfer the entire torque to the rotor shaft. Consequently, the torque division provided by the inventive system and method results in smaller and lighter components. As a result, a transmission incorporating such components as a whole will be smaller and lighter than if a single torque path or a two-way torque-split path were used.

Moreover, in the exemplary embodiment, by using face gears, a larger speed reduction may be accomplished such as a speed reduction of 4:1 by increasing the face gear 25 diameter, while maintaining "spur gear" type tolerances for thermal growth and deflections under load. Furthermore, the spur/face gear combinations have true conjugate actions so that the velocity of the driven gear is constant, resulting in relatively quiet and vibration free operation.

In summary, the exemplary embodiment gear arrangement in accordance with the present invention provides very efficient means to transmit torque through an angle, is tolerant of thermal changes and deflection under load. It can accommodate large speed reductions. The opposing gear mesh forces on the input mesh (i.e., the mesh between the pinion 21 and face gears 22a and 22b and spur gear 23) locate the input spur gear type pinion such that the torque must divide into three equal paths, with resulting weight and space reductions compared to a conventional drive.

Moreover, with the exemplary embodiment gear arrangement, each of the driven gears 22a, 22b and spur gear 23 may also be used to drive ancillary equipment such as electric generators, hydraulic pumps, oil pumps, etc. in a vehicle in which the gears are mounted, as for example a helicopter.

In an exemplary embodiment the inventive gear arrangement may be used to drive an optimum speed rotor ("OSR") or an optimum speed tilt rotor ("OSTR") as for example described in U.S. Pat. Nos. 6,007,298 and 6,641,365, respectively, the contents of which are incorporated herein by reference. In such case, the output shaft 32 is coupled to the OSR or OSTR. The inventive gearing arrangement will allow for the sufficient reduction of shaft 32 and thus, rotor RPM allowing for the optimum speed (i.e., RPM) operation of the OSR or OSTR.

As discussed above, this present invention has been described by way of exemplary embodiments. However, the invention should not only be limited to such embodiments. For example, in an alternate embodiment, the face gears 22a and 22b and the spur gear 23 can be positioned within the diameter of the output face gear 25. Similarly, in another alternate embodiment, the face gear 28 may be outside of the output face gear 25. In other alternate embodiments, instead of forming compound gears, anyone of the face gears 22a, 22b and 28 may be coupled to their corresponding spur gears 24a, 24b, and 24c, respectively, by other means, as for example by other gearing mechanisms or by being meshed directly or indirectly to each other.

In the exemplary embodiment described herein the compound gears 42a, 42b and 42c and shaft 26 are rotatably mounted by well known methods to a gear box housing (not shown). The gears may be made from any material suitable for the required torque transmission and the operational environment. In an exemplary embodiment, the gears are made from steel.

Moreover, the exemplary embodiment system has been described herein in relation to specific type of gears such as face and spur gears which simplify manufacture and assembly, tolerate discrepancies during operation better than other gear types, and reduce noise and vibration compared to other gear types. It should be understood, however, that the present invention can be practiced using other types of gears as for example tapered spur gears and/or bevel gears, than just those disclosed herein. Moreover, spur type gears may be used instead of face type gears and face type gears may be used instead of spur type gears.

The preceding description has been presented with reference to exemplary embodiments of the invention. Persons skilled in the art and technology to which this invention pertains will appreciate that alterations and changes in the described structures and methods of operation can be practiced without meaningfully departing from the principal, spirit and scope of this invention. Accordingly, the foregoing description should not be read as pertaining only to the precise structures and methods described and shown in the accompanying drawings.

The invention claimed is:

1. A gear arrangement comprising:
a first gear driven by an engine, wherein the first gear is a floating gear;
a second gear coupled to the first gear;
a third gear coupled to the first gear;
a fourth gear coupled to the first gear, wherein the first gear is meshed with the second, third, and fourth gears;
a fifth gear driven by the second gear;
a sixth gear driven by the third gear;
a seventh gear driven by the fourth gear;
an eighth gear driven by the fifth, sixth and seventh gears; and
a ninth gear and a tenth gear, wherein the ninth and tenth gears are driven by the fourth gear for driving the seventh gear, and wherein the second and fifth gears form a first compound gear, the third and sixth gears form a second compound gear, and the seventh and ninth gears form a third compound gear.

2. The gear arrangement as recited in claim 1 wherein the second, third, eighth and ninth gears are face gears and the first, fourth, fifth, sixth, seventh and tenth gears are spur type gears.

3. The gear arrangement as recited in claim 1 wherein the eighth gear drives an output shaft wherein an axis of rotation of the eighth gear is perpendicularly oriented relative to an axis of rotation of the first gear.

4. The gear arrangement as recited in claim 1 wherein the first gear is meshed with the second gear at a first mesh point, wherein the first gear is meshed with the third gear at a second mesh point and wherein the first gear is meshed with the fourth gear at a third mesh point, each mesh point being spaced apart from a subsequent mesh point by 120°.

5. The gear arrangement as recited in claim 4 wherein the first gear comprises a number of teeth, said number yielding a whole number when divided by the number three.

6. The gear arrangement as recited in claim 4 wherein the first gear comprises a number of gear teeth, said number not yielding a whole number when divided by the number three.

7. The gear arrangement as recited in claim 4 wherein a progressive mesh is generated between the first gear and the second, third and fourth gears.

8. The gear arrangement as recited in claim 1 wherein the fourth gear drives a shaft which drives the tenth gear.

9. The gear arrangement as recited in claim 8 wherein the second, third, eighth and ninth gears are face gears and the first, fourth, fifth, sixth, seventh and tenth gears are spur type gears.

10. The gear arrangement as recited in claim 8 wherein the eighth gear drives an output shaft wherein an axis of rotation of the eighth gear is perpendicularly oriented relative to an axis of rotation of the first gear.

11. A method of evenly dividing a torque among three gears, the method comprising:
coupling a driven gear to an engine;
meshing the driven gear to the three gears;
floating the driven gear among the three gears, wherein opposing gear mesh force generated between the meshing of each of said three gears directly with the driven gear positions the driven gear among the three gears such that torque is equally distributed to each of said three gears;
coupling an output gear to the three gears, wherein two of the three gears form a portion of corresponding compound gear to couple to the output gear;
driving a drive shaft with one of the three gears to drive a compound gear to couple to the output gear; and
wherein said three gears drive said output gear, with an axis of rotation of the output gear substantially perpendicular to an axis of rotation of the driven gear.

12. The method as recited in claim 11 wherein the driven gear comprises a number of teeth, with the number yielding a whole number when divided by the number three.

13. The method as recited in claim 11 wherein the driven gear comprises a number of teeth, with the number not yielding a whole number when divided by the number three.

14. The method as recited in claim 11 wherein two of the three gears are face gears and one of the three gears is a spur gear.

15. The method as recited in claim 11 further comprising driving with the output gear an output shaft, wherein an axis of rotation of the output gear is perpendicularly orientated relative to an axis of rotation of the driven gear.

16. The method as recited in claim 11 wherein meshing comprises meshing the driven gear to the three gears at three mesh points each mesh point being spaced apart from a subsequent mesh point by 120°.

17. The method as recited in claim 16 further comprising generating a progressive mesh between the driven gear and the three gears.

18. A method of driving an output gear comprising:
providing a first gear meshed with the output gear;
providing a second gear meshed with the output gear;
providing a third gear meshed with the output gear;
providing a fourth gear for driving the first gear;
providing a fifth gear for driving the second gear;
providing a sixth gear for driving the third gear;
meshing a driving gear to the fourth, fifth and sixth gears for driving the fourth, fifth and sixth gears, wherein the meshing comprises meshing the driving gear to the fourth, fifth and sixth gears at three mesh points, each mesh point being spaced apart from a subsequent mesh point by 120°; and
floating the driving gear between the fourth, fifth and sixth gears for equally dividing a torque provided by the driving gear between said fourth, fifth and sixth gears, wherein an axis of rotation of the output gear is perpendicularly orientated relative to an axis of rotation of the driving gear.

19. The method as recited in claim 18 wherein the fourth and fifth gears are face gears and the sixth gear is a spur gear.

20. The method as recited in claim 18 wherein the driving gear comprises a number of teeth, said number yielding a whole number when divided by the number three.

21. The method as recited in claim 18 wherein the driving gear comprises a number of teeth, said number not yielding a whole number when divided by the number three.

22. The method as recited in claim 18 wherein a progressive mesh is generated between the driving gear and the fourth, fifth, and sixth gears.

* * * * *